No. 756,021. PATENTED MAR. 29, 1904.
M. R. HULL.
STORM SHIELD FOR VEHICLES.
APPLICATION FILED OCT. 19, 1903.
NO MODEL.
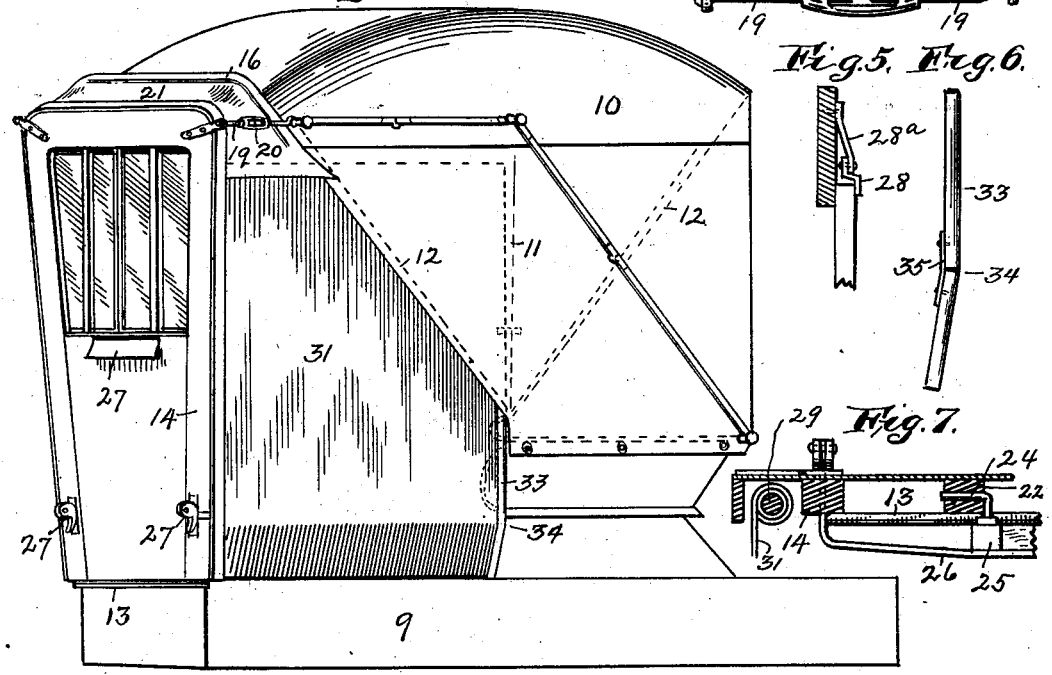
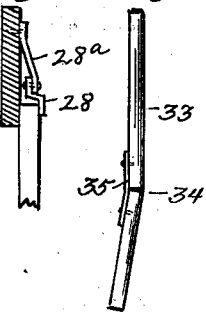
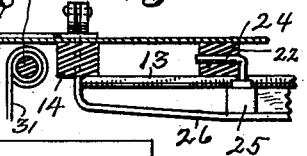
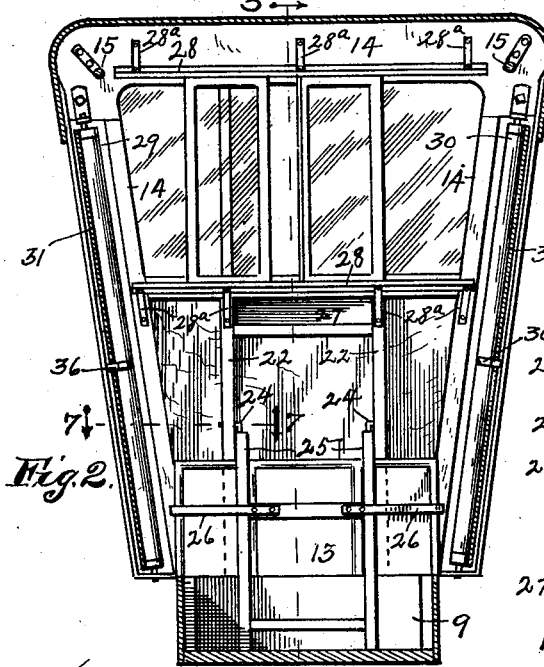
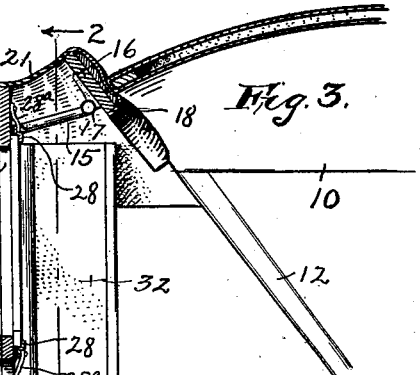
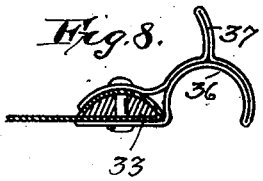
Inventor,
M. R. Hull,
By Jos. A. Minturn,
Attorney.

No. 756,021.

Patented March 29, 1904.

UNITED STATES PATENT OFFICE.

MATHEW ROBERT HULL, OF CONNERSVILLE, INDIANA, ASSIGNOR TO THE REX BUGGY COMPANY, OF CONNERSVILLE, INDIANA, A CORPORATION OF INDIANA.

STORM-SHIELD FOR VEHICLES.

SPECIFICATION forming part of Letters Patent No. 756,021, dated March 29, 1904.

Application filed October 19, 1903. Serial No. 177,679. (No model.)

*To all whom it may concern:*

Be it known that I, MATHEW ROBERT HULL, a citizen of the United States, residing at Connersville, in the county of Fayette and State of Indiana, have invented certain new and useful Improvements in Storm-Shields for Vehicles, of which the following is a specification.

This invention relates to improvements in attachments for temporarily closing the front openings to top-vehicles; and it has for its object the production of a device that will have its main support upon the front sill of the vehicle-bed and that will be applicable for attachment to vehicle-tops of wide variation in width and height and angular relation or slope of front bow.

The object is also to provide a device that is simple in construction, quickly attached or detached, and that affords free access in getting to and from the inside of the vehicle.

The invention consists in certain novel features of construction, as hereinafter shown and described, and specially pointed out in the claims.

In the accompanying drawings, Figure 1 represents a perspective view of a vehicle-body and foldable top with my improved shield applied; Fig. 2, a vertical section on the line 2 2 of Fig. 3; Fig. 3, a vertical section on the line 3 3 of Fig. 2; Fig. 4, a detail in side elevation of the turnbuckle used in connecting the shield to the vehicle-top; Fig. 5, a detail showing the construction of the adjustable slideway for retaining the sliding doors in the front of the storm-shield; Fig. 6, a detail of the curtain-stick, showing the jointed construction thereof; Fig. 7, a detail in horizontal section on the line 7 7 of Fig. 2; and Fig. 8, a detail in cross-section of the curtain-stick looking down on the hook for fastening the curtain to the bow of the top.

Like characters of reference indicate like parts throughout the several views of the drawings.

The invention is shown as applied to a piano-box top-buggy; but it is equally applicable to other styles of vehicles.

9 represents the body portion of the vehicle; 10 the foldable top, having the bows 11 and 12, and 13 is the dash.

The front of the shield is built upon a frame 14, preferably of wood, which is shaped to suit the style and size of the vehicle to which it is to be applied. This frame extends from about the upper line of the body portion 9 to a point opposite the front of the top portion 10. At the top of the frame on its inside are the brackets 15 15, which support the contact-board 16. The brackets have joints 17, Fig. 3, to allow for the adjustment of the board to suit the angle of the front bow of the top, which may vary in different vehicles, and as the height of the valance of the top above the bed differs in different vehicles I make the board 16 of sufficient width to allow for this variation. In order to make a water-tight joint between the storm-shield and the valance of the top, I provide the pad 18, into which the buggy-top is drawn by the means which secures the shield to said top. This means comprises a pair of bolts 19, attached at their respective ends to suitable eyes secured to the frame 14 and having hooks at their opposite ends which are hooked over the front posts which support the upper braces of the buggy-top. The bolts 19 have the turnbuckles 20, by means of which the storm-shield is drawn and held securely in place. A flexible covering 21, connecting the frame 14 with the board 16, forms a hood to exclude the weather.

The frame 14 comprises a pair of parallel vertical members 22, which have vertical series of holes 23 to receive pin extensions 24 of leg extensions 25. The latter are disposed on the inside of the dash with their lower ends resting upon the front sill of the body. The series of holes allows the frame to be adjusted at the proper height to reach the valance of the top and still permit the legs to rest on the floor-sill, as above described. The two legs 25 are connected by suitable cross-bars, to the upper of which are the steel spring extensions 26 26, which are bent at right angles past the ends of the dash and passing through suitable perforations of the frame 14 are secured to the cam-levers 27 27. By means of these cam-levers and the construction above described the frame 14 and the legs 25 are drawn together in a manner to clamp said parts securely to the dash and body-front. The spring of the spring-bars 26 is ample to allow for any variation in the thickness of the dashes and fronts of different vehicles to which the storm-shield may be applied. A metal bearing-plate will preferably be used between the cam-lever and the frame 14 to protect the latter.

At the top of the vertical members 22 is an opening for the driving-lines, which will be partially closed by means of the flap 27. Above this opening is a window containing glass lights. These will preferably be four in number, the two outer of which will be stationary, while the two inner ones, which are mounted in movable sashes, will be laterally movable with the latter. These movable sashes will run in metal guides formed of strips of double-angled strap-iron 28, bent, as shown, in cross-section. To the outer flanges of the top and bottom guide-strips spring holding-bars 28$^a$ will be riveted and the outer ends of the strips riveted to the frame. By this means "give" enough is afforded to the sashes to permit their easy sliding movement, while the guides have sufficient resiliency to close up the sashes, so as to keep them from rattling from the movement of the vehicle.

The frame 14 and its hood will be covered with waterproof material of substantially the same as the covering of the vehicle-top, so that when in position the shield will conform closely in appearance to said top. This covering of the frame is applied exteriorly, thereby leaving an inside recess in which adjacent to the side edges are mounted vertically-disposed ratchetless spring-operated curtain-rollers 29 and 30, to which are attached laterally-extensible side curtains 31 and 32, respectively, as shown in Figs. 1, 2, 3, and 7. These curtains conform to the area between the frame 14 and the vehicle top and body, being long enough to reach to the vertical bow 11. The outer end of the curtain is provided with the stick 33, having the flexible joint 34 adjacent to its lower end to allow the bottom of the curtain to be drawn in close to the vehicle-body. In fact, the normal condition of the curtain when drawn out will be with this lower inwardly-drawn portion as shown in Fig. 1, such shape being given by the action of the spring-plate 35, which forms the hinge connection between the divided parts of the curtain-strip, and the spring-hinge allows the curtain to straighten when being rolled up.

Fastened to the curtain-strip about midway of its length is the hook 36, which is made to engage the bow 11 and hold the curtain. On the release of the hook the curtain closes automatically, leaving the side open and free for the entry or departure of the occupant. The hook 36, as shown in Fig. 8, has the finger-hold 37 to facilitate the drawing out and securing of the curtain.

The size and shape of the several parts will be varied to suit the style of vehicle without departing from the spirit of this invention.

Having thus fully described my improvement, what I claim as new, and wish to secure by Letters Patent, is—

1. A shield-frame having vertical brace members, a yoke connected adjustably with said brace members and constituting an adjustable supporting device, and clamping means to force the said yoke and shield-frame in the direction of each other.

2. A storm-shield attachment for vehicles comprising a frame detachably secured to the dash or front of the vehicle-body, a padded board at the top of the shield to contact with the front bow of the vehicle-top, and means for closely joining said board and top.

3. A storm-shield for vehicles comprising a substantially vertical frame, a wide board secured to the top of said frame obliquely thereto having a padded outer side and hooks to connect the shield to the vehicle-top, said hooks having turnbuckles.

4. A storm-shield for vehicles comprising a main frame, means for securing it at the bottom to the dash or vehicle-body, a board hinged to the top of the main frame so as to be adjustable in its angular relation thereto the outer side of said board being padded, a vehicle-top, a hooked rod on each side of the shield secured to the main frame and adapted to be secured by means of the hook with the posts supporting the top braces of the vehicle-top, said rods each having turnbuckles.

5. A storm-shield for vehicles comprising a main frame, said frame having an observation-aperture, laterally-sliding glass-holding frames in said aperture and elastic runs or slides for said frames elastically supported and held against said frame.

6. In a storm-shield for top-vehicles, a main frame having its top secured to the vehicle-top and having its bottom disposed in front of the dash or vehicle-body, auxiliary legs removably and adjustably secured to the main frame above the dash and having their lower ends resting upon the front sill of the body and means for clamping the dash between the main frame and the said legs.

7. In a storm-shield for top-vehicles, a main frame having its top secured to the vehicle-top and having its bottom disposed in front of the dash or vehicle-body, auxiliary legs removably secured to the main frame above the dash having their lower ends resting upon the front sill of the body, spring-bars extending from the legs laterally around the dash and bent at right angles and passing through the main frame, and cam-levers to clamp the main frame and legs to the dash or body-front.

8. A storm-shield attachment for vehicles comprising an approximately vertical frame adapted for detachable connection to the dashboard of a vehicle, means for detachably connecting said frame to the front bow of the vehicle, and spring-actuated side curtains mounted perpendicularly in said frame extensible rearwardly therefrom and provided at their free ends with curtain-sticks having spring-joints near their lower ends and means for detachable engagement with side members of a vehicle-top.

9. A storm-shield attachment for vehicles comprising a main frame adapted for detachable connection to the dashboard of a vehicle, means for detachably connecting said frame with the front bow of the vehicle, and spring-actuated side curtains mounted perpendicularly in said frame extensible rearwardly therefrom and provided at their free ends with curtain-sticks and hooks secured to said sticks for detachable engagement with side members of a vehicle-top said hooks having finger-holds or handles for convenient movement.

In witness whereof I have hereunto set my hand and seal, at Connersville, Indiana, this 8th day of October, A. D. 1903.

MATHEW ROBERT HULL. [L. S]

Witnesses:
C. C. HULL,
J. M. HERON.